United States Patent [19]

Weinberg

[11] Patent Number: 4,566,085
[45] Date of Patent: Jan. 21, 1986

[54] HIGH INTENSITY ULTRASONIC GENERATOR

[75] Inventor: Stanley Weinberg, Los Angeles, Calif.

[73] Assignee: Wein Products, Inc., Los Angeles, Calif.

[21] Appl. No.: 340,598

[22] Filed: Jan. 19, 1982

[51] Int. Cl.⁴ .......................... H04B 1/02; G08B 3/10
[52] U.S. Cl. .................................. 367/139; 116/22 A; 340/384 E
[58] Field of Search .............................. 367/139, 910; 340/384 E; 181/159; 116/22 A; 43/124; 330/264, 277

[56] References Cited

U.S. PATENT DOCUMENTS

| | | | |
|---|---|---|---|
| 3,683,113 | 8/1972 | Stewart | 367/139 |
| 4,297,538 | 10/1981 | Massa | 181/159 |
| 4,338,593 | 7/1982 | Mills | 367/139 |
| 4,392,215 | 7/1983 | Hall | 367/139 |

OTHER PUBLICATIONS

Markus, John; *Guidebook of Electronic Circuits;* 1974; pp. 661-673.
"An Ultrasonic UCS" by E. Kent and S. P. Grossman, Physiological Behavior 3(2), pp. 361-362 (1968).
"Some Examples of Ultrasonic Frequency Sensitive and Frequency Insensitive Biological Reactions" by R. G. Busnel.

*Primary Examiner*—Theodore M. Blum
*Assistant Examiner*—Gregory C. Issing
*Attorney, Agent, or Firm*—Price, Gess & Ubell

[57] ABSTRACT

A high intensity ultrasonic sound generator for producing bursts of ultrasonic frequency and a method of controlling vermin and pests by projecting such bursts into a space from which such vermin and pests are desired to be eradicated. The apparatus has a transformerless power supply employing a voltage divider with a low leakage input capacitor and an output capacitor having a significantly larger capacitance than that of the input capacitor, and wherein the load is voltage dependent so that the greater the charge on the output capacitor, the greater the load and, therefore, the output capacitor is prevented from excessively charging. Ultrasound frequency is generated by two astable multivibrators one of which duty cycles the other and means are provided to vary the frequency within each burst and the burst interval. Means are provided, including parallel LC network with the transducer, which may be set to resonance, in order to reduce unwanted audio, and also including means for rounding the envelope of the bursts of ultrasonic frequency. The speaker includes a free floating cone, with no other mechanical connection than its mechanical connection to the transducer.

13 Claims, 7 Drawing Figures

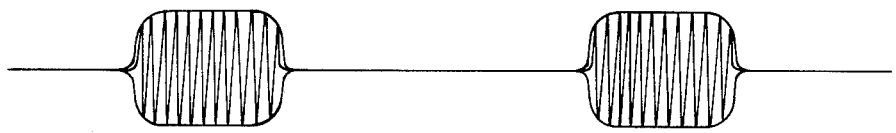
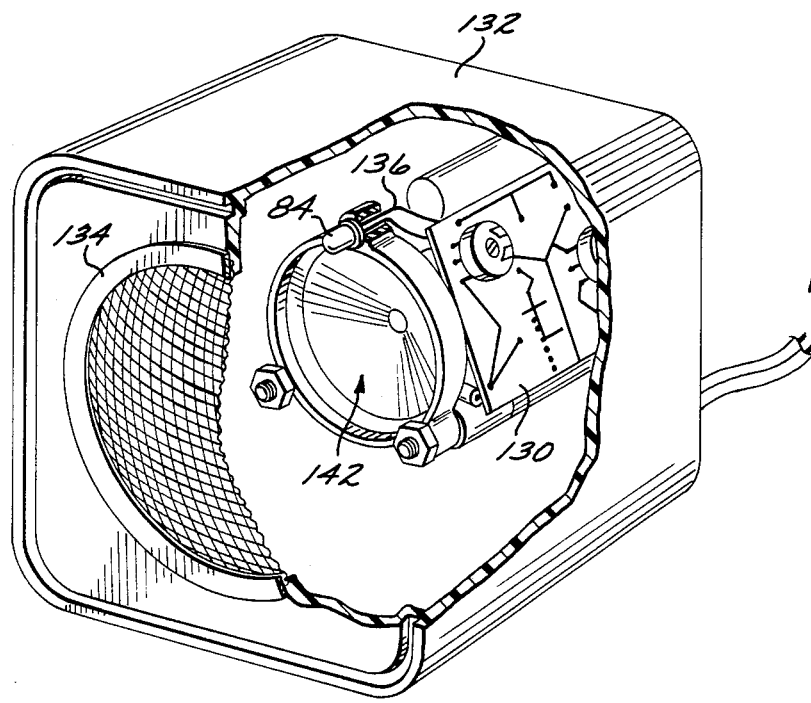
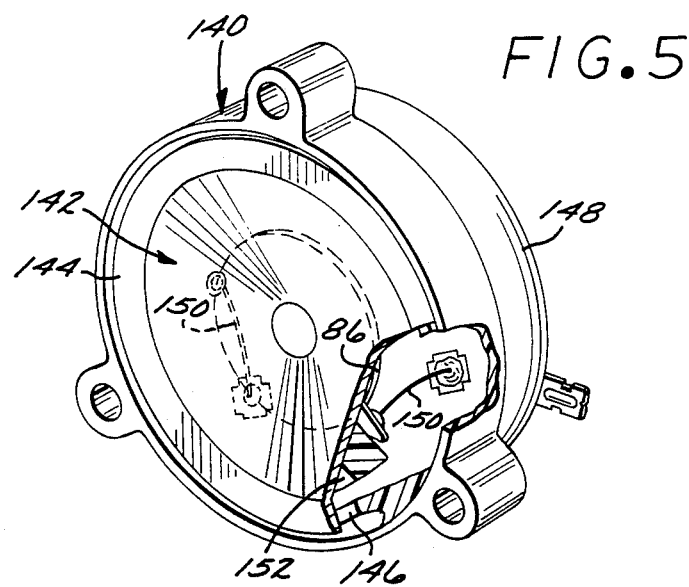

HIGH INTENSITY ULTRASONIC GENERATOR

FIELD OF THE INVENTION

The present invention relates to the field of high intensity ultrasonic generators, and also to the use of such generators for the control of vermin and pests.

BACKGROUND AND SUMMARY OF THE INVENTION

It is known in the art of vermin and pest control that such vermin or pests as rodents, cockroaches and insects, e.g., mosquitos and flies are very sensitive to ultrasonic vibrations. Such ultrasonic vibration of sufficient intensity and duration can affect the nervous system of such vermin and pests and eventually cause disabling or mortal effects. As a consequence, when exposed to such ultrasonic vibrations these vermin and pests either attempt to avoid them or suffer the other consequences.

In the present art of ultrasonic generators, particularly of the kind used for pest control, a transformer with a rectified output is used to provide a DC voltage to a 555 integrated circuit of the kind manufactured by RCA arranged as an astable generator. The output on pin 3 of such an integrated circuit is employed to drive a piezoelectric transducer connected mechanically to a speaker to produce ultrasonic vibrations. Such a piezoelectric transducer and speaker cone may be of the type made by Motorola as a model KSN 1038A or KSN 1041A.

By connecting pin 5 of the 555 integrated circuit to the low voltage side of the transformer, the prior art circuit results in a sweep of the output square wave frequency over a narrow range.

Vermin and pests of the type noted above appear to be susceptible to sweeping of the ultrasonic frequency, and the greater the sweep the greater the detrimental effect of the ultrasonic frequency sonics on the pest. In addition, sweeping the frequency randomly prevents the pests from becoming acclimated to the ultrasonic frequency, which would detract from its pest control effectiveness. Further, pulsed bursts of ultrasonic frequency appear to be very effective for pest control.

The prior art devices which employ a transformer in the power supply require the bulk, weight and expense of a transformer. In addition, when considering a unitary design for the United States and Europe, this cannot be effected with a single transformer because of the difference in AC voltage between, respectively, 110 VAC and 220 VAC and different frequencies of from, e.g., 25 Hz to 60 Hz. Further, a transformer creates a great problem in heat generation during operation, which can create a danger when the ultrasonic apparatus is used for pest control and placed in remote and unairconditioned spaces, e.g., an attic.

An additional consideration is that the ultrasonic devices of the prior art are output limited to about 125 db which inhibits somewhat their effectiveness. The piezoelectric transducer is also driven continuously, creating further heat generation problems.

There is also a need for a small, light-weight speaker (transducer) which is efficient at the ultrasonic, as opposed to audio, ranges, which is easy to manufacture and inexpensive in cost.

It has also been a problem with prior art ultrasonic vibration generators of the kind used for pest control that they tend to emit some sound in the audio range. This can be very distracting in habitat and work areas.

The problems enumerated in the foregoing are not intended to be exhaustive, but rather are among many which tend to impair the effectiveness and usefulness of known ultrasonic vibration generators, and their use for vermin and pest control. Other noteworthy problems may also exist; however, those presented above should be sufficient to demonstrate that prior art ultrasonic vibration generators used in the past, and their use for vermin and pest control have not been altogether satisfactory.

Recognizing the need for a better ultrasonic pest and vermin control apparatus and a cheaper and more effective means for generating these ultrasonic vibrations, it is a general feature of the present invention to provide a novel ultrasonic vibration generator.

It is a further feature of the present invention to provide a cheaper and more versatile ultrasonic vermin and pest control apparatus which requires no input transformer, thereby eliminating all of the attendant problems caused by having an input transformer.

It is a still further feature of the present invention to provide a novel and more effective means for varying the ultrasonic output in order to control pests by generating periodic bursts of ultrasonic frequency and sweeping the ultrasonic frequency during each burst, in a manner which preferably differs from burst to burst.

Another feature of the present invention is a novel means of significantly reducing the audio sound output during ultrasonic vibration generation.

Still another feature of the present invention is a speaker means which increases the efficiency of producing ultrasonic vibrations without a significant change in the cost, size or configuration of presently used speakers.

An ultrasonic vibration generator according to presently preferred embodiments of the present invention, and intended to substantially incorporate the above-noted features, includes a transformerless pulsed sweep ultrasonic generator. The ultrasonic generator of the present invention is capable of producing a low duty cycle pulsed sweep of ultrasonic vibrations from about 25 KHz to 55 KHz with no input transformer. Also, the apparatus of the present invention can produce about 100 times the ultrasound level of similar known ultrasonic generators, i.e., about 150 db.

A cascaded voltage doubler supplies output DC voltage to a CMOS integrated circuit of quad 2 input NOR gates, one half of which acts as an astable multivibrator gates, and the other half of which acts as a duty cycle generator for the one half, the duty cycle of which and the oscillating frequency of which are determined all in accordance with external circuit components connected to the pins of the integrated circuit.

The output of the integrated circuit controls a VMOS power amplifier which includes a ringing circuit that is gated by the VMOS in response to the output pulses from the astable multivibrator during each burst of multivibrator output pulses, which creates a relatively large, 80 V peak-to-peak, voltage to a mechanical transducer, e.g., a piezoelectrical crystal transducer, at a swept ultrasonic frequency. The transducer is mechanically connected to a throatless free-floating speaker. The net effect is one of having a transformerless swept tone burst generator in the ultrasonic range with, in addition, a more efficient speaker arrangement.

Examples of the more important features of the present invention have thus been summarized rather broadly in order that the detailed description that follows may be better understood, and in order that the contribution to the art may be better appreciated. There are, of course, additional features which will be described hereinafter and which will also form the subject of the appended claims. These features and advantages of the present invention will become apparent with reference to the following detailed description of preferred embodiments in connection with the accompanying drawings, wherein like reference numerals have been applied to like elements.

BRIEF DESCRIPTION OF THE DRAWINGS

FIG. 3 shows an output wave form of the ultrasonic vibrations;

FIG. 4 shows a perspective partially cut-away view of a speaker according to the present invention;

FIG. 5 shows a perspective partially cut-away view of the apparatus of the present invention showing the location of the system-on indicating light of the present invention;

DETAILED DESCRIPTION OF THE INVENTION

Figure 1:
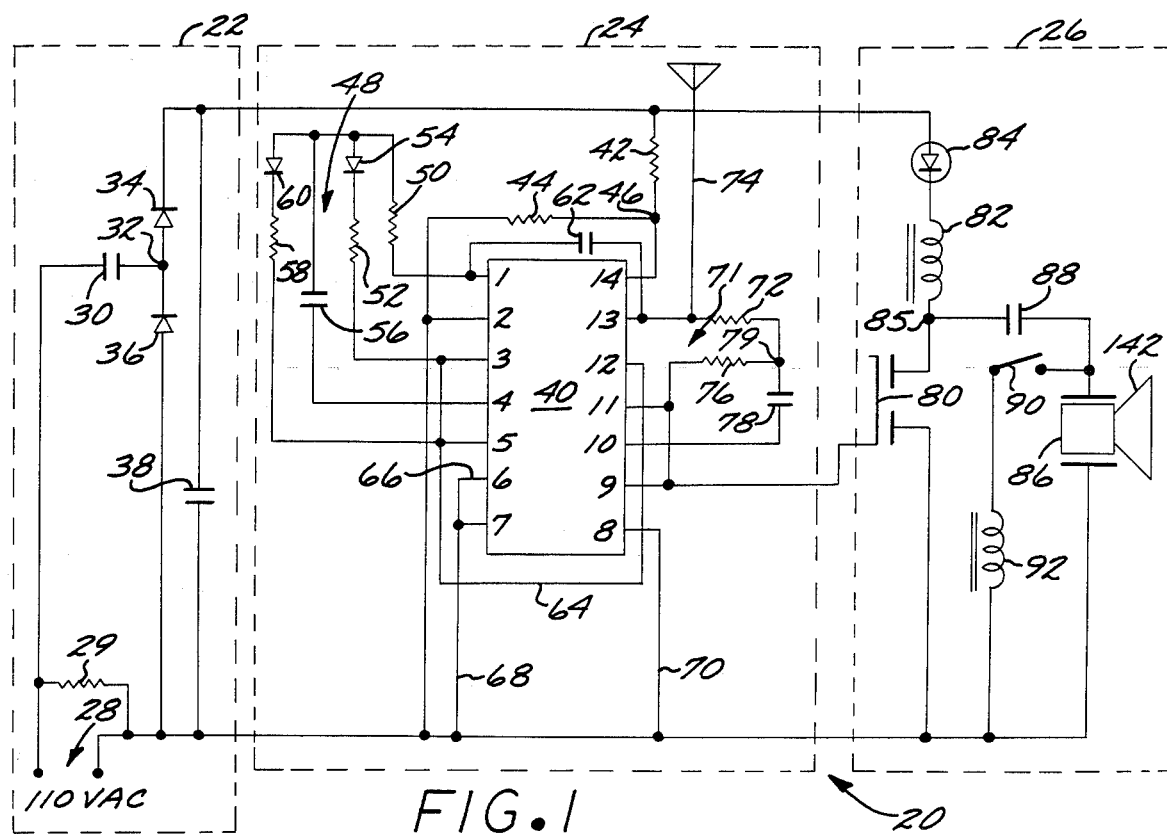
FIG. 1 shows a schematic drawing of a circuit according to one embodiment of the present invention.

Turning now to FIG. 1, the circuit 20 according to the present invention is shown to have a power supply section within phantom lines 22, a pulse generator section within phantom lines 24 and a transducer drive section within phantom lines 26.

The power supply section 22 has an AC voltage supply 28 which may be, e.g., either 110 VAC or 220 VAC and, e.g., from 25 Hz to 60 Hz. Across the AC voltage supply 28 is a dumping resistor 29. Electrically connected to one terminal of the AC voltage supply 28 is one side of a 1.5 μ fd capacitor 30, is a low leakage, e.g., film, paper or tantalum dielectric capacitor) the opposite side of which is connected to node 32 between two diodes 34 and 36 connected anode to cathode, with the anode of diode 36 connected to the common, i.e., ground side of AC voltage supply 28. Electrically connected from the cathode of diode 34 to ground is a 1000 μ fd capacitor 38. With this cascaded voltage doubler arrangement, due to the fact that low leakage capacitor 30 is small in comparison to capacitor 38, capacitor 38 changes relatively slowly, and will not get more than about 5 V above normal system voltage of 35 V, due to continually being discharged through the load created by the pulse generator section 24 and transducer drive section 26.

The pulse generator section 24 consists of quad 2 input-CMOS NOR gate integrated circuit 40, e.g., an RCA CD 4001BE integrated circuit, one half of which supplies a square wave swept about approximately 30 KHz and duty cycled by the other half. Connected between the cathode of diode 34 and ground is a 30K resistor 42 and a 16K resistor 44 with the junction 46 between the two connected to pin 14 of the CMOS 40 to supply system voltage $V_{DD}$. System voltage $V_{DD}$ thus varies as the charge on capacitor 38 and increases as the charging of capacitor 38 occurs in the power supply section 22, and decreases as charge is removed from capacitor 38 during driving of the pulse generator section 24, and the transducer drive section 26. The circuit components and operation are selected to have a duty cycle for the generation of bursts of ultrasonic frequency, which provides sufficient load on the capacitor 38 to prevent it from being charged more than to about 40 volts, where 35 volts is nominal $V_{DD}$. $V_{DD}$ is actually the charge on capacitor 38 times the ratio of the resistance of resistor 44 divided by the sum of the resistances of resistors 44 and 42 which form a voltage divider, thereby keeping $V_{DD}$ below the limits of CMOS 40, i.e., about 16 volts. Further, since the output capacitor 38 is much larger in capacitance than the input capacitor 30, the output capacitor 38 charges relatively slowly. Since, as will appear below, the burst repetition rate, the oscillating frequency during each burst and the magnitude of the ultrasound generation each vary directly with the charge across capacitor 38, the greater the charge thereon, the greater the drain from the load, thus preventing excessive charging of the output capacitor 38.

Connected to pins 1 and 3–5 of the CMOS 40 is the duty cycle network 48 which consists of a 1.5M ohm resistor 50 connected to pin 1; a 4.7M ohm resistor 52 and a diode 54 connected to pin 3, with the cathode of the diode 54 electrically connected to pin 3 through resistor 52; a 0.1μ fd capacitor 56 connected to pin 4; and a 10M ohm resistor 58 and a diode 60 connected to pin 5 with the cathode of the diode 60 connected to pin 5 through resistor 58. The anodes of diodes 54 and 60 and the opposite ends of resistor 50 and capacitor 56, from, respectively pins 1 and 4, are all electrically connected.

Pin 1 of the CMOS integrated circuit 40 is connected to pin 13 through a 22 pf capacitor 62. Pin 12 is connected by jumper 64 to pins 3 and 5. A jumper 66 connects pins 6 and 7 and pins 7 and 8 are connected to ground by, respectively, leads 68 and 70. Pin 2 is connected to ground on the grounded side of resistor 44.

Connected to pins 10–13 of the CMOS is the frequency control circuitry 71 which controls the output ultrasonic frequency within the duty-cycled tone bursts. Pin 13 is connected to pins 11 and 9 through a 1.5M ohm resistor 72 and a 75K ohm resistor 76, with an antenna 74 connected between pin 13 and resistor 72. The antenna 74 may conveniently be formed of a short length of insulated wire. A 22 pfd capacitor 78 connects the node 79 between resistors 72 and 76 and pin 10 of the CMOS 40.

The transducer drive section 26 comprises a VMOS FET 80, e.g., a ZVN0109A made by Ferranti. The GATE of the FET 80 is connected to pins 11 and 9, with the DRAIN of the FET connected through a 5.6 Millihenry choke 82 and a light emitting diode (LED) 84 to the power supply section 12, and the SOURCE of the FET 80 connected to ground. Between the DRAIN of FET 80 and the 5.6 Millihenry choke is a node 85 which is connected to ground through a 5 μ fd capacitor 88 and a piezoelectric transducer 86, e.g., of the kind included in exponential tweeters made by Motorola under Model Nos. KSN 1038A or KSN 1041A. The transducer 86 is mechanically connected to the cone 142 of a speaker for producing ultrasonic vibration in response to electrical stimulation of the transducer 86, as is explained in more detail below. Connected across the transducer 86 and ground is a high/low switch 90 and a 100 Microhenry choke 92.

In operation of the circuit of FIG. 1, the power supply section 22 provides a varying DC input voltage at the node 46 to pin 14 as capacitor 38 charges. The duty cycle circuitry 48 establishes a duty cycle, i.e., when the output of CMOS 40 is on and off, and the frequency control circuitry 71 determines the output frequency during each duty cycle. The antenna 74 picks up 60 cycle hum present in the atmosphere surrounding the circuitry of the present invention, and together with the charging of capacitor 78 causes a sweep of the output frequency which is randomized during each duty cycle. By randomized it is meant that at the commencement of and during each burst duty cycle the value of $V_{DD}$ varies depending on the charge on output capacitor 38, and also due on occasion depending on the input from antenna 74, thus varying the charge and rate of charge of capacitor 78, and therefore the oscillating frequency output of the CMOS 40, in a manner which varies from tone burst to tone burst.

The VMOS 80 and the ringing circuit of choke 82 and capacitor 88 acts as a power amplifier of the signal on the gate of the VMOS. A VMOS FET 80 is selected because of its compatibility with the output of CMOS 40 and because its reaction time is small enough to be effective at ultrasonic frequencies, i.e., having an $F_T$ of, e.g., 800 MHz. The high/low switch 90, when shut places the choke 92 in shunt across the transducer 56, which tends to reduce audio output of the speaker 142.

Figure 2:
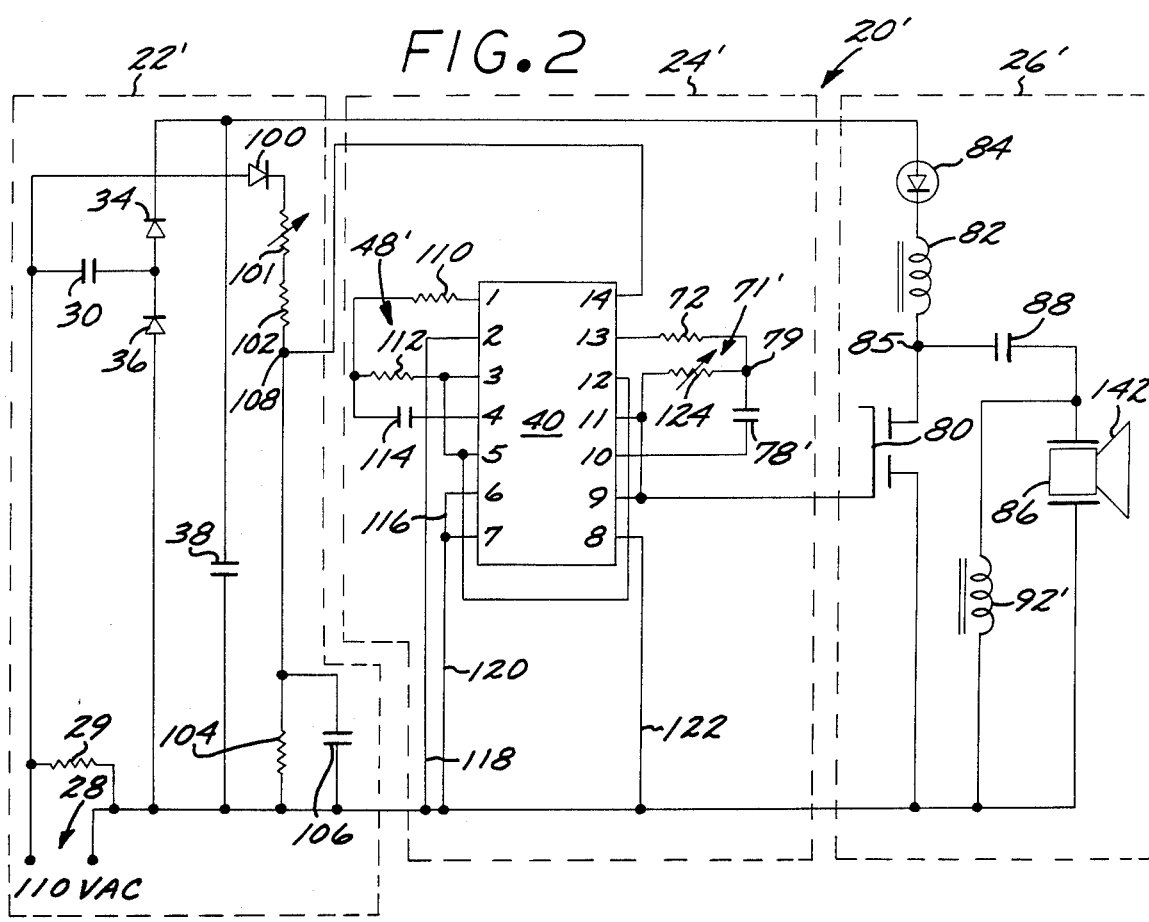
FIG. 2 shows a schematic drawing of a circuit according to a second embodiment of the prevent invention.

Turning now to FIG. 2, a second embodiment of a circuit 20' according to the present invention is shown. The power supply circuitry 22' has been modified to take the input to pin 14 from across capacitor 30 through a diode 100, a variable resistor 101, variable up to 100K ohms, and a 16K ohm resistor 102. The resistor 102 is connected to ground through a parallel RC network consisting of a 5.1K ohm resistor 104 and a 0.33 μ fd capacitor 106. The node 108 between resistor 102 and RC network 104, 106 is connected to pin 14. With this arrangement, due to the effect of RC network 104, 106, the system voltage on pin 14, $V_{DD}$, varies cyclically in a roughly sinusoidal manner about 5 V DC, due to the voltage divider action of network 101, 102, 104 and 106.

The pulse generator section 24' has duty cycle circuitry 48' which includes a 1.5M ohm resistor 110 connected to pin 1, a 1.5M ohm resistor 112 connected to pin 3 and a 0.1 fd capacitor 114, each connected also to the other. Pins 3 and 5 are jumpered together and pins 2, 6, 7 and 8 are grounded.

The frequency control circuitry 71' has been modified from that of FIG. 1 by eliminating the antenna 74, replacing resistor 76 with a variable resistor 124, variable to 100 K ohms, and replacing the 22 pfd capacitor 78 with a 220 pfd capacitor 78'.

In the transducer drive section 26' the high/low switch 90 has been removed and the 100 MicroHenry choke 92 has been replaced by a 220 MicroHenry choke 92' connected across the transducer 86.

In operation, the circuit of FIG. 2, functions similarly to the circuit of FIG. 1. The variable resistor 101 is adjusted during the manufacturing process to achieve an oscillating roughly sine wave input to pin 4 due to the effect of diode 100, resistors 101, 102 and 104 and capacitor 106, forming a 60 Hz low voltage ramping network, varying about 5 V DC. This input to pin 14 in the embodiment of FIG. 2 results in sweeping of both the duty cycle and the oscillator output frequency. Variable resistor 101 is also adjusted to keep the DC voltage on capacitor 38 at about 35 V. The low 5 V DC varying voltage modulates the drain resistance (R|$_{DS}$ ON) of VMOS 40 to round the envelope. $R_{DS}$, the dynamic drain source resitance of the VMOS 40 is thus modulated to prevent abrupt changes in current through the choke 82, also thereby preventing audio-producing shock excitation of the transducer 86.

The variable resistor 124 in the oscillator frequency circuitry 71 is also adjusted at manufacture to achieve resonance between choke 92' and the transducer 86. A variable resistor 124 is needed because manufacturing tolerances for both the choke 92' and transducer 86 can result in them being out of resonance without adjusting the output frequency of the variable oscillator, about which sweep occurs, by changing the value of resistor 124 so that the output frequency about which sweep occurs can be modified to output the transducer 86 and choke 92' in resonance at that frequency. Resonance between choke 92' and transducer 86 severely dampens the audio output, which adds to the audio dampening effect of capacitor 88.

Providing pin 14 with a roughly sinusoidal input voltage also assists in reducing the audio output of the transducer 86 which can be caused by shock excitement of the piezoelectric crystal of the transducer 86 due to the rate at which the modulation on the GATE of FET 80 reaches threshhold voltage. The rounded wave from input on pin 14 produces a rounded envelope at the initiation of each duty cycle as shown in FIG. 3, whereas the circuit of FIG. 1 will tend to have an abrubter initiation of the duty cycle to on, which can cause intermittent audio production by the transducer 86.

Turning now to FIG. 4, it can be seen that a printed circuit board (PCB) 130, upon which all of the components of the circuits 20, 20' of FIGS. 1 or 2 are conveniently mounted, is contained within a housing 132 having a speaker grating 134. The LED 84 is connected to the PCB 130 by short relatively rigid external leads 136 which may be on the LED 84 as supplied by the manufacturer. For convenience of wiring and for avoiding costly production requirements and a potential for damage to the LED 84 during installation or use of the present invention, the LED 84 is positioned inside the housing 132 so as to be visible from outside the housing 132 by viewing through the speaker grating 134.

Turning now to FIG. 5, a speaker 140 according to the present invention is shown. To make the speaker 140 of the present invention, an exponential horn tweeter piezo ceramic speaker made by Motorola under Model Nos. KSN 1038A or KSN 1041A was modified to make a speaker 140 having a free-floating speaker cone 142. The throat and the phaser plug of the above-noted models of speaker are removed from the housing 132 and replaced by simply a grating 134 (shown in FIG. 4), which does not tend to block or dampen ultrasound vibrations. Rigid connection between the speaker 142 and the speaker housing 132 is eliminated. In the speaker as made by Motorola a throat and phaser plug press the circumference 144 of the cone 142 against a ridge 146 on a speaker casing 148. Apart from the removal of the throat and phaser plug, the construction of the above-noted models of speaker need not be changed. However, a further modification, which improves greatly the ultrasonic output performance of a piezo ceramic speaker of the kind noted above, is to remove the rubber sheet covering the side of the multimorph wafer, forming the piezo-ceramic crystal, which is opposite the side attached to the speaker cone 142 and which dampens a smooth response for audio use. With the speaker cone 142 free-floating, the only thing which holds the speaker cone 142 in the speaker casing 148 is the lead wires 150 to the piezoelectrical crystal 86. A foam donut 152, such as comes with Models KSN 10138A or 1041A, is optionally included, as its elimination will not detract from the mechanical connection of the piezoelectrical crystal 86 and the cone 142, and may serve to even slightly improve the ultrasonic response of the speaker 140. In fact, it has been found that elimination of the entire speaker casing 148, and leaving the cone 142 supported only by its mechanical connection to the piezoelectrical crystal 86, providing some rigid support for the piezoelectric crystal (with the foam donut 52 being optional) gives the best ultrasonic response for the speaker 140.

Figure 6:
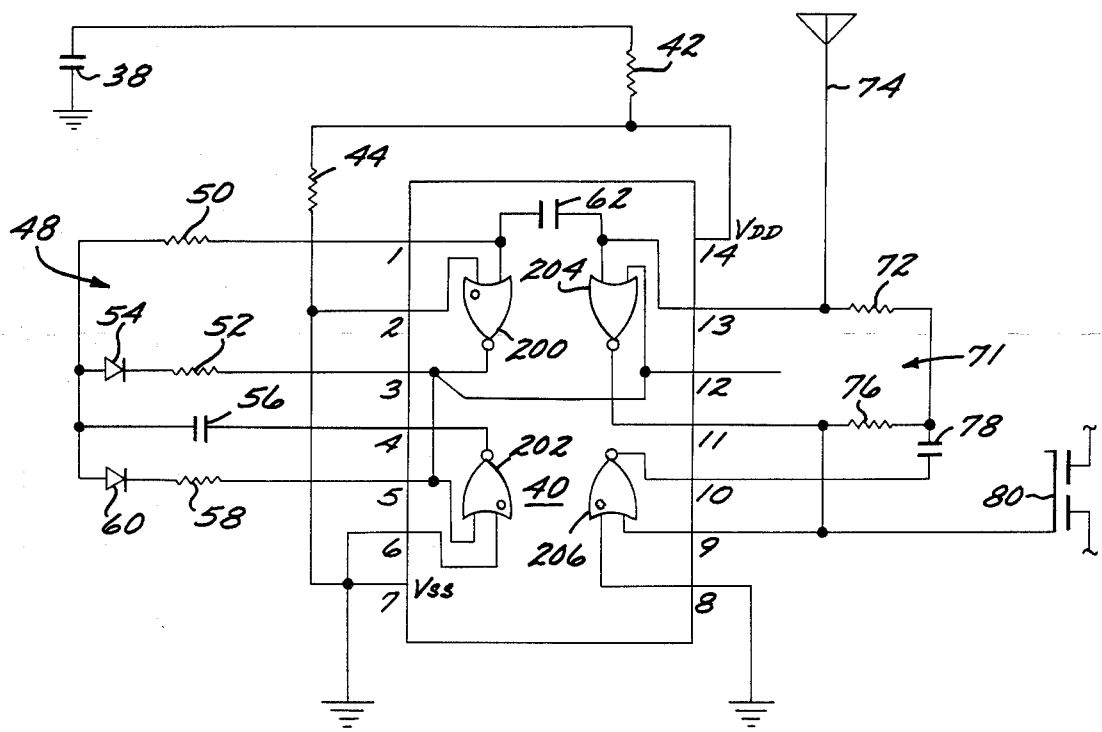
FIG. 6 shows a detail of the pulse generator section of FIG. 1, including the logic circuitry of the integrated circuit.

Turning now to FIG. 6 a detail of the pulse generator section 24 of FIG. 1 is shown, including the logic circuitry of the CD4001BE. Pin 14 supplies system voltage $V_{DD}$ to the CMOS circuit elements forming the logic gates shown in FIG. 6. Pin 7 is system ground or common $V_{SS}$. The enabling network is formed by a pair of NOR gates 200 and 202, one input of each of which is grounded, i.e., on pins 2 and 6. These are always held at a low level, i.e., logic "0." The output on pin 3 of NOR gate 200 forms a direct input on pin 5 to logic NOR gate 202. The output on pin 4 of NOR gate 202 forms an input on pin 1 to NOR gate 200 through an RC delay line 50, 56. Shunting the RC delay line 50, 56 back to pins 3 and 5 is a pair of resistors 52, 58 in parallel, each with an associated diode 54, 60. The values of resistors 52 and 58 are selected to give, in conjunction with capacitor 56, the enabling network a time constant such that the on time is longer than the off time, sufficiently to ensure that the load on the output capacitor 38 of the power supply section is sufficient to keep the value of the voltage across capacitor 38 from getting more than about 5 volts DC above nominal system voltage of 35 volts DC.

The output on pin 3 is also the enabling input to pin 12 of the variable frequency oscillator which includes a pair of NOR gates 204 and 206. The duration of the enabling signal on pin 12, which is one input to NOR gate 204 determines the duration of a respective burst of pulses ultrasonic frequency generated by NOR gates 204 and 206 and supplied to the GATE of FET 80.

The output on pin 11 of NOR gate 204 forms an input to NOR gate 206, the other input of which is grounded to $V_{SS}$. The output of NOR gate 206 forms the other input on pin 13 to NOR gate 204 through a delay line which includes an RC time constant provided by resistor 72 and capacitor 78. Also connected to pin 13 is a capacitor 62, which changes during the period that NOR gate 204 is enabled, to thereby vary the time constant of the RC network 72, 78, thus sweeping the frequency of the output pulses on pin 11 of the variable frequency oscillator formed by NOR gates 204 and 206, from a first frequency to a second higher frequency. The antenna 74 also impresses a voltage change on pin 13, due to picking up, e.g., 60-cycle hum from the atmosphere or the power cord to the VAC input 28. This impressed voltage may be at times significant enough, depending on the intensity of the 60-cycle hum, to contribute to randomizing the sweeping of the ultrasonic frequency within respective bursts.

Figure 7:
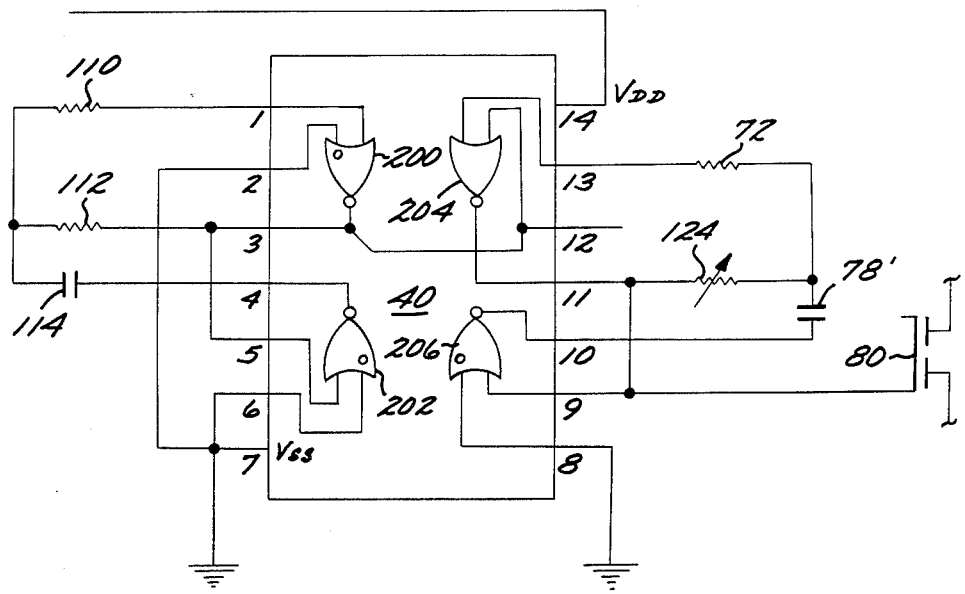
FIG. 7 shows a detail of the pulse generator section of FIG. 2, including the logic circuitry of the integrated circuit.

The circuitry shown in FIG. 7 works essentially the same way, with the exception that $V_{DD}$ on pin 14 is varying in a cyclical fashion, due to the effect of the parallel RC network 104, 106 in the power supply section 22' shown in FIG. 2. As $V_{DD}$ varies, the rate at which capacitor 114 charges varies, thus changing the duty cycle from burst to burst. Further, as $V_{DD}$ changes the frequency at which NOR gates 204, 206 oscillate when enabled during a given duty cycle changes, thereby sweeping the frequency of production of output pulses on pin 11 to the FET 80 in a manner which corresponds to the cyclical variation of $V_{DD}$ during any given enabling period, i.e., during a given burst. The greater the charge on capacitor 38, i.e., the real time $V_{DD}$, the shorter the time interval between enabling periods.

SUMMARY OF THE ADVANTAGES AND SCOPE OF THE INVENTION

It will be appreciated that in constructing an ultrasonic vibration generator according to the present invention, certain advantages are obtained. In particular, the transformer power input has been eliminated which reduces the cost, size, power consumption and power loss of the present invention. Further, this allows use at different AC frequencies, e.g., 25 Hz, 50 Hz, and 60 Hz. Also, the use of two astables, one driving the other, enables better variety in the choice of duty cycle and sweeping of both the duty cycle and the ultarasonic frequency during the duty cycle, in order to form a tone burst generator. Tone bursts of the kind produced according to the present invention are particularly useful in controlling vermin and pests, since the variations in the occurrence of bursts and the variation during the bursts prevent the vermin or pests from becoming acclimated to the ultrasound. Further, distracting audio output has been reduced with the circuitry, as discussed above. The speaker of the present invention also forms a very compact light-weight speaker which is highly efficient for ultrasound generation, resulting in about a 12 db gain over known speaker constructions.

The foregoing description of the invention has been directed to particular preferred embodiments in accordance with the requirements of the patent statues and for purposes of explanation and illustration. It will be apparent, however, to those skilled in this art, that many modifications and changes in both the apparatus and method of the present invention may be made without departing from the scope and spirit of the invention. For example, certain features of the circuit of FIG. 1 may be incorporated as well in the circuit of FIG. 2, and other circuit components may conveniently be substituted to perform the functions of the circuits disclosed in this application. By way of example, the use of resonance to suppress audio emissions may be incorporated in the circuit of FIG. 1 from the circuit of FIG. 2. The antenna of the circuit of FIG. 1 could be placed in the circuit of FIG. 2. Further, other logic networks using other than NOR gates will function as oscillating pulse generators, and can be set up one to duty cycle the other. Also, a transducer other than a piezo-ceramic multimorph wafer construction may be used in the present invention, e.g., an electromagnetic ribbon tweeter, e.g., of the kind made under the name "Dyna Flat," which would be substituted for the choke and transducer in series with the LED, and may have a resonance capacitor in parallel therewith. It will be further apparent to those skilled in the art that the invention may be used with other suitable modifications within the skill of the art which would be apparent to one skilled in the art. It is the applicants' intention to cover in the following claims all such equivalent modifications and variations as fall within the true scope and spirit of the invention.

What is claimed is:

1. An ultrasonic vibration generator comprising:
   a variable frequency oscillator means for producing an oscillating signal at a variable ultrasonic frequency, responsive to a varying frequency control input signal to the variable frequency oscillator;
   frequency control input signal means for providing the varying frequency control input signal to the variable frequency oscillator means;
   speaker means, responsive to the output of the variable frequency oscillator means, for producing mechanical vibrations; and
   amplifier means for amplifying the output of the variable frequency oscillator and providing the amplified output of the variable frequency oscillator to the speaker means, said amplifier means including a VMOS field effect transistor having a drain; a choke; a capacitor, the choke and the capacitor each having a first terminal connected to the drain of said field effect transistor; and an inductive load in parallel with the speaker means, the parallel combination of the inductive load and speaker means being connected to a second terminal of said capacitor;
   the inductive load and the speaker means having respective inductive and capacitive values which provide resonance between the inductive load and the speaker means at a selected output frequency of the variable frequency oscillator means.

2. The apparatus of claim 1 further comprising:
   the variable frequency oscillator means including a first pair of logic gates, the output of one forming an input to the other and the output of the other forming an input to the one through a time delay line;
   the enabling means for periodically enabling the variable frequency oscillator means including a second pair of logic gates the output of one forming an input of the other and the output of the other forming an input to the one through a time delay line, the time delay line in the enabling means being relatively long in comparison to the time delay line in the variable frequency oscillator means; and
   the output of the enabling means forming an input to the variable frequency oscillator means, to periodically enable the variable frequency oscillator means.

3. The apparatus of claim 2 further comprising:
   the time delay line of the variable frequency oscillator means including an RC time constant and determining the output frequency of the variable frequency oscillator; and
   the time delay line of the enabling means including an RC time constant and determining the duration of each enabling period.

4. The apparatus of claim 3 further comprising:
   means for varying the RC time constant of the variable frequency oscillator time delay line during each enabling period;
   means for varying the RC time constant of the enabling means time delay line, during each enabling period, and
   means for varying the interval between enabling periods.

5. The apparatus of claim 4 further comprising:
   the means for varying the RC time constant of the variable frequency oscillator time delay line, the means for varying the RC time constant for the enabling means time delay line, and the means for varying the interval between enabling periods, each including means for providing such variation in a random manner.

6. The apparatus of claim 1, further comprising:
   the speaker means including an electrically excited transducer; and
   an inductive load in parallel with the electrically excited transducer.

7. The apparatus of claim 1, further comprising:
   the speaker means including a piezoelectric crystal having an internal capacitance; and
   an inductive load in parallel with the electrically excited transducer and having an the piezoelectric crystal and the inductive load at a selected frequency within the range of output frequencies generated by the variable frequency oscillator means.

8. The apparatus of claim 1, further comprising:
   the speaker means including an electrically excited transducer and a speaker cone connected to the wafer, the speaker cone not being held in place by other than the mechanical connection to the transducer.

9. The apparatus of claim 1, further comprising:
   the speaker means including a multimorph piezoceramic wafer transducer and a speaker cone mechanically connected on one surface of the wafer, the speaker cone not being held in place by other than the mechanical connection to the transducer, and the opposite side of the wafer having no coating of dampening material.

10. An ultrasonic sound generator comprising:
    a means for generating electrical signals at ultrasonic frequency;
    an electrically excited transducer means for converting the ultrasonic frequency electric signals into mechanical vibrations;
    a speaker means having a speaker cone mechanically connected to the transducer means and not held in place by other than the mechanical connnection to the transducer.

11. The apparatus of claim 10 further comprising:
    the transducer means comprising a multi-morph piezo-ceramic wafer.

12. The apparatus of claim 11 further comprising:
    the speaker cone connected to one surface of the wafer and the opposite surface being without a dampening coating.

13. An ultrasonic vibration generator comprising:
    a variable frequency oscillator means for producing an oscillating signal at a variable ultrasonic frequency, responsive to a varying frequency control input signal to the variable frequency oscillator;
    frequency control input signal means for providing the varying frequency control input signal to the variable frequency oscillator means;

speaker means, responsive to the output of the variable frequency oscillator means, for producing mechanical vibrations;

the speaker means including a multimorph piezo-ceramic wafer transducer, a speaker casing and a speaker cone, free floating within said casing and mechanically connected on one surface of the wafer, the speaker cone not being held in place within said said casing by other than the mechanical connection to the transducer, and the opposite side of the wafer having no coating of dampening material; and amplifier means for amplifying the output of the variable frequency oscillator and providing the amplified output of the variable frequency oscillator to the speaker means, said amplifier means including a VMOS field effect transistor having a drain; a choke; a capacitor, said choke and capacitor each having a first terminal connected to the drain of said field effect transistor; and an inductive load in parallel with the speaker means, the parallel combination of said inductive load and speaker means being connected to a second terminal of said capacitor;

the inductive load and the speaker means having respective inductive and capacitive values which provide resonance between the inductive load and the speaker means at a selected output frequency of the variable frequency oscillator means.

* * * * *